(12) United States Patent
Keating et al.

(10) Patent No.: US 10,423,245 B2
(45) Date of Patent: Sep. 24, 2019

(54) TECHNIQUES FOR PROVIDING USER INPUT TO A DEVICE

(71) Applicant: QUALCOMM Incorporated, San Diego, CA (US)

(72) Inventors: Virginia Walker Keating, San Diego, CA (US); Niccolo Andrew Padovani, San Diego, CA (US); Gilad Bornstein, Haifa (IL); Thien Lee, San Diego, CA (US); Nathan Altman, Raanana (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/610,746

(22) Filed: Jan. 30, 2015

(65) Prior Publication Data

US 2015/0220169 A1 Aug. 6, 2015

Related U.S. Application Data

(60) Provisional application No. 61/934,658, filed on Jan. 31, 2014.

(51) Int. Cl.
*G06F 3/033* (2013.01)
*G06F 3/0354* (2013.01)
(Continued)

(52) U.S. Cl.
CPC .......... *G06F 3/03545* (2013.01); *G06F 3/017* (2013.01); *G06F 3/046* (2013.01)

(58) Field of Classification Search
CPC ...... G06F 3/03545; G06F 3/038; G06F 3/017; G06F 3/0346; G06F 3/046; G06F 3/0233;
(Continued)

(56) References Cited

U.S. PATENT DOCUMENTS 5,902,968 A * 5/1999 Sato .................... G06F 3/03545
178/19.01
6,249,234 B1 6/2001 Ely et al.
(Continued)

FOREIGN PATENT DOCUMENTS

CN 101872259 A 10/2010
CN 102135816 A 7/2011
(Continued)

OTHER PUBLICATIONS

International Search Report and Written Opinion—PCT/US2015/014097—ISA/EPO—dated Apr. 8, 2015.
(Continued)

*Primary Examiner* — Benjamin C Lee
*Assistant Examiner* — Gerald L Oliver
(74) *Attorney, Agent, or Firm* — Kilpatrick Townsend & Stockton, LLP

(57) ABSTRACT

Techniques and apparatus are described for obtaining user input via a stylus configured to serve as an interface for providing user input into a computing device. The computing device may obtain rotation-related information indicative of rotational position or rotational movement of the stylus about a longitudinal axis of the stylus. The computing device may identify an operation in response to the rotation-related information, and perform the identified operation.

30 Claims, 7 Drawing Sheets

(51) Int. Cl.
*G06F 3/01* (2006.01)
*G06F 3/046* (2006.01)

(58) Field of Classification Search
CPC ............ G01D 5/2073; H04M 2250/22; H04W 52/0254
See application file for complete search history.

(56) References Cited

U.S. PATENT DOCUMENTS

| | | | |
|---|---|---|---|
| 9,285,903 | B1* | 3/2016 | Yun ................. G06F 3/041 |
| 2002/0060670 | A1 | 5/2002 | Jaeger et al. |
| 2005/0225541 | A1 | 10/2005 | Lapstun et al. |
| 2006/0028446 | A1 | 2/2006 | Liberty et al. |
| 2006/0262105 | A1* | 11/2006 | Smith ................. G06F 3/0486 345/179 |
| 2006/0282063 | A1 | 12/2006 | Gotani |
| 2009/0044153 | A1 | 2/2009 | Lindberg et al. |
| 2010/0206645 | A1 | 8/2010 | Harel |
| 2011/0175599 | A1 | 7/2011 | Liu |
| 2011/0241657 | A1* | 10/2011 | Nishiono ........... G06F 3/03549 324/207.13 |
| 2012/0007713 | A1 | 1/2012 | Nasiri et al. |
| 2012/0038572 | A1 | 2/2012 | Kim et al. |
| 2012/0206349 | A1 | 8/2012 | Nowatzyk et al. |
| 2012/0327042 | A1 | 12/2012 | Harley et al. |
| 2013/0009907 | A1 | 1/2013 | Rosenberg et al. |
| 2013/0088465 | A1 | 4/2013 | Geller et al. |
| 2013/0106740 | A1* | 5/2013 | Yilmaz ............... G06F 3/038 345/173 |
| 2013/0120281 | A1 | 5/2013 | Harris et al. |
| 2013/0125068 | A1 | 5/2013 | Harris et al. |
| 2013/0194176 | A1 | 8/2013 | Chung |
| 2013/0257777 | A1 | 10/2013 | Benko et al. |
| 2014/0009392 | A1 | 1/2014 | Ikemoto et al. |
| 2014/0022218 | A1 | 1/2014 | Parekh et al. |
| 2014/0035886 | A1 | 2/2014 | Idzik et al. |
| 2014/0337791 | A1 | 11/2014 | Agnetta et al. |
| 2014/0347290 | A1* | 11/2014 | Han ................. G06F 3/046 345/173 |
| 2015/0220168 | A1 | 8/2015 | Keating et al. |

FOREIGN PATENT DOCUMENTS

| | | |
|---|---|---|
| CN | 102725712 A | 10/2012 |
| EP | 1821182 A1 | 8/2007 |
| EP | 2687950 A1 | 1/2014 |
| JP | S63211014 A | 9/1988 |
| JP | H0830374 A | 2/1996 |
| JP | 2003005879 A | 1/2003 |
| JP | 2007079673 A | 3/2007 |
| JP | 2009288968 A | 12/2009 |
| JP | 2010055627 A | 3/2010 |
| JP | 2010157930 A | 7/2010 |
| JP | 2010191588 A | 9/2010 |
| JP | 2012509544 A | 4/2012 |
| JP | 2012156923 A | 8/2012 |
| JP | 2013242821 A | 12/2013 |
| JP | 2014531675 A | 11/2014 |
| JP | 2015225527 A | 12/2015 |
| WO | WO-2011154950 A1 | 12/2011 |
| WO | 2012147349 A1 | 11/2012 |
| WO | WO-2013049286 A1 | 4/2013 |

OTHER PUBLICATIONS

Bi X., et al., "An Exploration of Pen Rolling for Pen-Based Interaction", Proceedings of the 21st Annual ACM Symposium on User Interface Software and Technology, UIST '08, Oct. 22, 2008 (Oct. 22, 2008), p. 191, XP055091713, New York, USA, DOI: 10.1145/1449715.1449745 ISBN: 978-1-59-593975-3.

Suzuki Y., et al., "Stylus Enhancement to Enrich Interaction with Computers", Jul. 22, 2007, Human-Computer Interaction, Interaction Platforms and Techniques; [Lecture Notes in Computer Science], Springer Berlin Heidelberg, pp. 133-142, XP019062489, ISBN: 978-3-540-731 06-1.

* cited by examiner

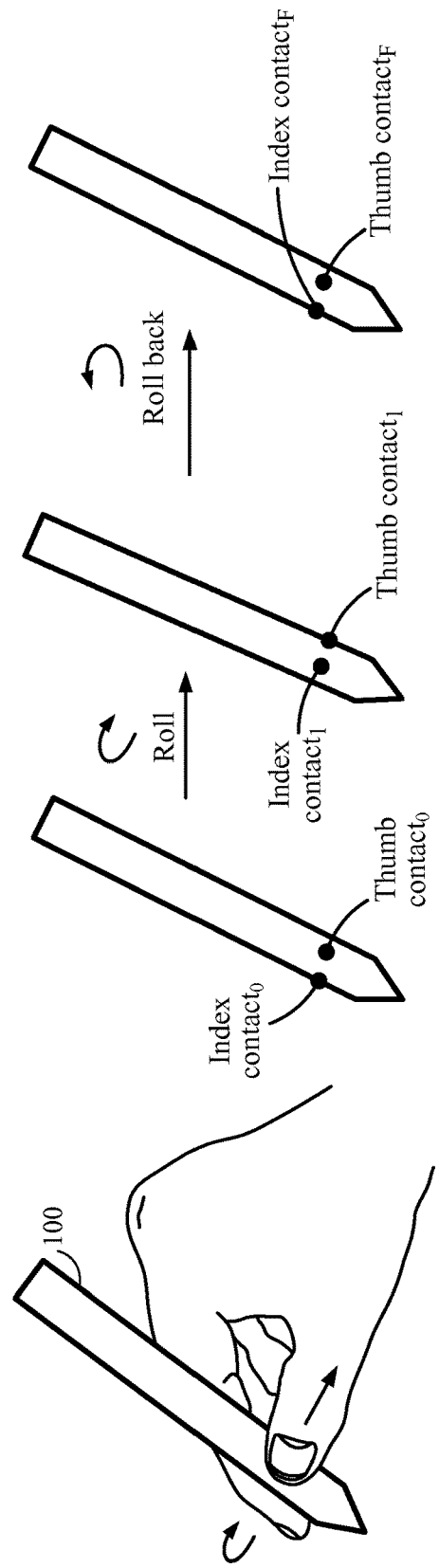

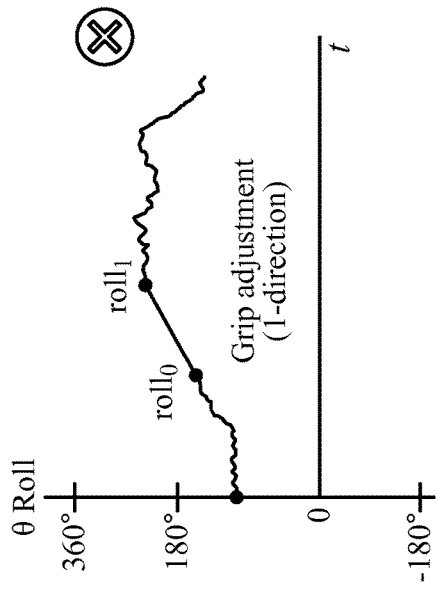
FIG. 4A
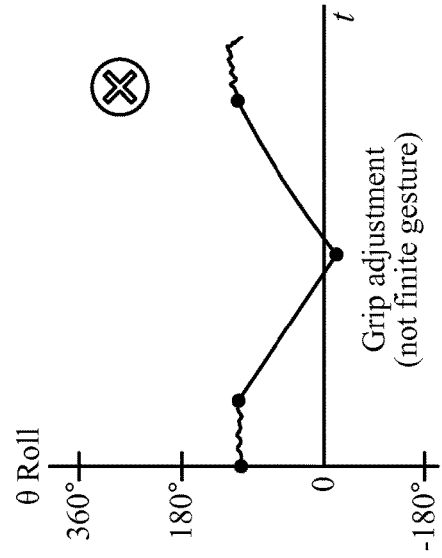
FIG. 4B
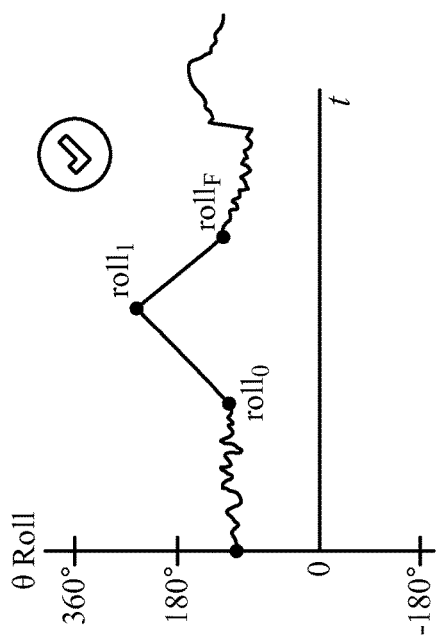
FIG. 4C
FIG. 4D
Micro-Twist vs. Fiddling

TECHNIQUES FOR PROVIDING USER INPUT TO A DEVICE

CROSS-REFERENCE TO RELATED APPLICATIONS

This Application claims the benefit of U.S. Provisional Application No. 61/934,658, entitled "METHODS AND APPARATUSES FOR IDENTIFYING ROLLING GESTURES ON A DEVICE," filed Jan. 31, 2014, which is assigned to the assignee of the present application and hereby expressly incorporated by reference.

This application is related to U.S. patent application Ser. No. 14/610,683, entitled "TECHNIQUES FOR IDENTIFYING ROLLING GESTURES ON A DEVICE," filed on the same day, which is assigned to the assignee of the present application and hereby expressly incorporated by reference.

TECHNICAL FIELD

The present disclosure relates generally to identifying commands from a device, and in particular, to identifying gestures from a stylus.

BACKGROUND

One of the main advantages of digital pens or styluses or styli is that they offer the possibility of increased functionalities available to a user compared to a conventional pen. Devices might be able to differentiate between pen-on-screen touch vs. finger touch, on-screen pen vs. finger gestures, detect a combination of pen and finger gestures, in-air pen vs. finger gestures, off-screen pen input, pen buttons, etc. In order to keep complexity down and usability up, most pens currently mimic touch and only have a few pen-specific inputs which are available, such as button use, hover, and in-air gestures. Button use is generally reserved for one or two high-level functions and in-air gestures need a separate mode to be activated.

SUMMARY

In one example, a method for obtaining user input via a stylus configured to serve as an interface for providing user input to a computing device is disclosed. The method includes, in part, obtaining, at the computing device, rotation-related information indicative of a first rotational movement of the stylus in a first direction about a longitudinal axis of the stylus followed by a second rotational movement of the stylus in a second direction opposite the first direction about the longitudinal axis, identifying, at the computing device, an operation in response to the rotation-related information, and performing, at the computing device, the identified operation.

In one example, identifying the operation includes, in part, analyzing the rotation-related information to distinguish intended-gesture rotational movement to be used as user input to the computing device from unintended-gesture rotational movement not used as user input to the computing device.

In one example, the rotation-related information comprises magnetic sensor readings from at least one magnetic sensor aboard the computing device. The magnetic sensor readings measure forces from at least one magnetic field emanating from at least one magnetic field source aboard the stylus. In one example, the at least one magnetic sensor includes, in part, at least one inductor coil positioned within a display panel of the computing device. In one example, the at least one magnetic field source includes, in part, at least one active magnetic field emitter positioned off of the longitudinal axis of the stylus.

In one example, the method further includes, in part, determining a ratio between magnitudes of a first magnetic sensor reading from a first sensor and a second magnetic sensor reading from a second sensor, and identifying the operation based at least on the determined ratio.

In one example, the rotation-related information includes, in part, positional information derived from at least one positional sensor aboard the stylus and communicated to the computing device.

In one example, the method further includes, in part, obtaining, at the computing device, orientation-related information indicative of a side of the stylus which is facing a reference direction, and identifying the operation in response to the orientation-related information.

In one example, an apparatus for obtaining user input via a stylus is disclosed. The apparatus includes, in part, means for obtaining rotation-related information indicative of a first rotational movement of the stylus in a first direction about a longitudinal axis of the stylus followed by a second rotational movement of the stylus in a second direction opposite the first direction about the longitudinal axis, means for identifying an operation in response to the rotation-related information, and means for performing the identified operation.

In one example, an apparatus for obtaining user input via a stylus is disclosed. The apparatus includes at least one processor and a memory coupled to the at least one processor. The at least one processor is configured to obtain rotation-related information indicative of a first rotational movement of the stylus in a first direction about a longitudinal axis of the stylus followed by a second rotational movement of the stylus in a second direction opposite the first direction about the longitudinal axis, identify an operation in response to the rotation-related information, and perform the identified operation.

In one example, a non-transitory processor-readable medium for obtaining user input via a stylus configured to serve as an interface for providing user input to a computing device is disclosed. The non-transitory processor-readable medium includes processor-readable instructions configured to cause a processor to obtain rotation-related information indicative of a first rotational movement of the stylus in a first direction about a longitudinal axis of the stylus followed by a second rotational movement of the stylus in a second direction opposite the first direction about the longitudinal axis, identify an operation in response to the rotation-related information, and perform the identified operation.

In one example, an apparatus for providing user input is disclosed. The apparatus includes, in part, an elongated body having a first and a second distal end. Rotational position or rotational movement of the elongated body is configured to provide user input to a computing device. The least one sensor or emitter physically coupled to the elongated body to facilitate gathering of rotation-related information by the computing device, the rotation-related information indicative of the rotational position or the rotational movement of the elongated body about a longitudinal axis of the elongated body.

In one example, the at least one sensor or emitter comprises at least one active magnetic field emitter. In one example, the at least one active magnetic field emitter includes a first magnetic field emitter transmitting a first magnetic field with a first orientation, and a second magnetic field emitter transmitting a second magnetic field with a second orientation. The first orientation may be different from the second orientation. In one example, each of the at least one active magnetic field emitters transmit an emitter-specific code.

In one example, the at least one active magnetic field emitter includes a first magnetic field emitter transmitting a first magnetic field during a first time duration, and a second magnetic field emitter transmitting a second magnetic field during a second time duration. The first time duration may be different from the second time duration.

In one example, the at least one sensor or emitter includes at least one positional sensor. In one example, the positional sensor is an accelerometer. In one example, the at least one sensor or emitter is positioned off the longitudinal axis of the elongated body. In one example, the at least one sensor or emitter includes a first sensor or emitter positioned perpendicular to a second sensor or emitter.

In one example, the rotation-related information is indicative of a rotational movement of the elongated body about the longitudinal axis to achieve a turn angle corresponding to a user-intended command. In one example, the rotation-related information is indicative of a first rotational movement of the elongated body about the longitudinal axis followed by a second rotational movement of the elongated body in a second direction opposite the first direction about the longitudinal axis.

In one example, a method for providing user input is disclosed. The method includes, in part, providing user input to a computing device by rotational position or rotational movement of an elongated body of a stylus, the elongated body having a first and a second distal end. The user input is based on rotation-related information gathered using at least one sensor or emitter physically coupled to the elongated body. The rotation-related information is indicative of the rotational position or the rotational movement of the elongated body about a longitudinal axis of the elongated body.

In one example, an apparatus for providing user input is disclosed. The apparatus includes, in part, an elongated body having a first and a second distal end. The rotational position or rotational movement of the elongated body is configured to provide user input to a computing device. The apparatus further includes means for sensing or indicating rotation of the elongated body physically coupled to the elongated body. The means for sensing or indicating rotation of the elongated body is configured to facilitate gathering of rotation-related information. The rotation-related information is indicative of the rotational position or the rotational movement of the elongated body about a longitudinal axis of the elongated body.

In one example, a non-transitory processor-readable medium for providing user input is disclosed. The non-transitory processor-readable medium includes, in part, processor-readable instructions configured to cause a processor to provide user input to a computing device by rotational position or rotational movement of an elongated body of a stylus, the elongated body having a first and a second distal end. The user input is based on rotation-related information gathered using at least one sensor or emitter physically coupled to the elongated body. The rotation-related information is indicative of the rotational position or the rotational movement of the elongated body about a longitudinal axis of the elongated body.

In one example, a method for obtaining user input via a stylus configured to serve as an interface for providing user input into a computing device is provided. The method includes, in part, obtaining, at the computing device, rotation-related information indicative of rotational position or rotational movement of the stylus about a longitudinal axis of the stylus, identifying, at the computing device, an operation in response to the rotation-related information. In one example, the operation is unrelated to drawing. The method further includes, in part, performing, at the computing device, the identified operation. In one example, the operation includes executing a function, opening an application, and/or any other functions.

In one example, the rotation-related information is indicative of a rotational movement of the stylus about the longitudinal axis to achieve a turn angle corresponding to a user-intended command. In one example, the turn angle is one of a plurality of turn angles, each representing a different user-intended command. In one example, the rotation-related information is indicative of a rotational position of the stylus about the longitudinal axis.

In one example, identifying the operation includes, in part, analyzing the rotation-related information to distinguish intended rotational movement to be used as user input to the computing device from unintended rotational movement not used as user input to the computing device.

In one example, the rotation-related information includes, in part, magnetic sensor readings from at least one magnetic sensor aboard the computing device, the magnetic sensor readings measuring forces from at least one magnetic field emanating from at least one magnetic field source aboard the stylus. In one example, the at least one magnetic sensor includes, in part, at least one inductor coil positioned within a display panel of the computing device.

In one example, the at least one magnetic field source includes, in part, at least one active magnetic field emitter positioned off of the longitudinal axis of the stylus. In one example, the method further includes, in part, determining a ratio between magnitudes of a first magnetic sensor reading from a first sensor and a second magnetic sensor reading from a second sensor, and identifying the operation based at least on the determined ratio. In one example, the rotation-related information includes, in part, positional information derived from at least one positional sensor aboard the stylus and communicated to the computing device.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 3A through 3D illustrate an exemplary micro-twist gesture, in accordance with certain embodiments of the present disclosure.

FIGS. 4A through 4D illustrate exemplary graphs showing angle of rotation with respect to time for different gestures, in accordance with certain embodiments of the present disclosure.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The term "stylus" is used herein to refer to an elongated input device that can be held by a user's hand and used in conjunction with a computing device to send user-defined inputs to the computing device. The terms digital pen, stylus, input device, pen, pointing device and the like may be used interchangeably throughout this document.

The term computing device is used herein to refer to a device capable of receiving and processing data from an input device. The computing device may include any kind of processors, such as general purpose processors, special purpose processors, micro-controllers, digital signal processors and the like. The computing device may be a tablet, a smartphone, a handheld computer or any other type of portable or fixed devices.

Although some embodiments are described herein in terms of a display panel, it is to be understood that other devices capable of sensing an object touching or hovering above the device can be used according to various embodiments. In this document, the terms rolling and twisting are used interchangeably. Rolling refers to the motion of rolling a stylus between a user's fingers the stylus thereby rotating along its longitudinal axis.

Certain embodiments leverage sensors and/or transformers (e.g., magnetic emitters) embedded in a stylus to enable identifying rolling gestures by a computing device. In addition, the computing device may be able to determine whether the user has deliberately twisted the pen as a gesture or if it was a manipulation of pen grip for other reasons.

One embodiment defines a micro-twist gesture as a short duration, low movement gesture (for example, a movement of less than a full twist (360 degree turn angle) or less than a half twist (180 degree turn angle)), which can vary depending on the user's grip style. In one embodiment, the user may be able to input the micro-twist gesture without enabling a separate mode. According to one embodiment, rotation-related information may be obtained by the computing device. The rotation-related information may include information about rotational position or rotational movement of the stylus about a longitudinal axis of the stylus. The rotation-related information may include start of a movement (twist_0), intensity of the movement (twist_speed), movement direction (twist_direction), end of the movement, and the like. The rotation-related information may be used to identify an intended gesture accurately and avoid false positives.

Figure 1:
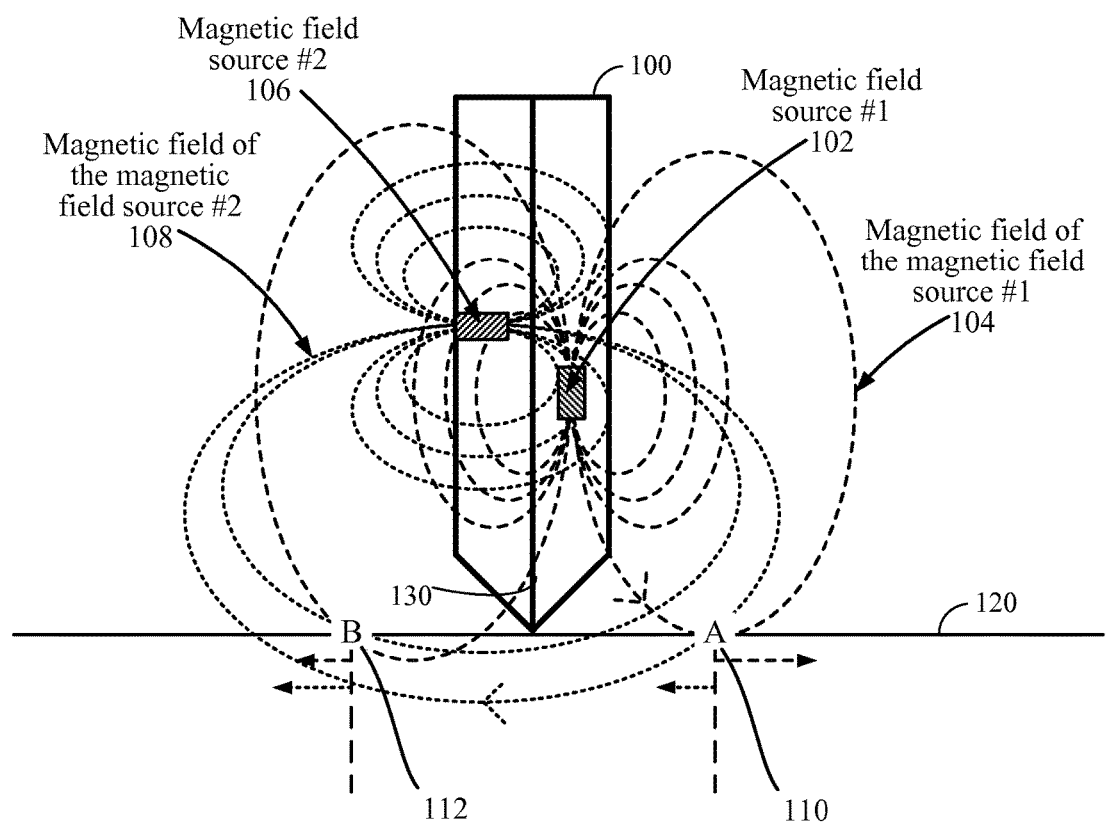
FIG. 1 illustrates an exemplary digital stylus including two transformers, in accordance with certain embodiments of the present disclosure.

FIG. 1 illustrates an exemplary stylus 100 including two magnetic field sources 102 and 106, in accordance with certain aspects of the present disclosure. As illustrated, the stylus includes a first magnetic field source 102 and a second magnetic field source 106, which are perpendicular to each other. Although only two magnetic field sources are shown in FIG. 1, in general, the stylus may include any number of magnetic field sources (e.g., one, one or more, two or more, three or more, etc.). In addition, the magnetic field sources may have any orientation with respect to each other without departing from the teachings herein. In one embodiment, the magnetic field sources may be parallel to each other, and be located off the longitudinal axis 130 of the stylus. In another embodiment, the magnetic field sources may be perpendicular to each other. In yet another embodiment, one or more magnetic field sources may be parallel to each other while being perpendicular to other magnetic field sources. In general, the magnetic field sources may be positioned on the stylus either uniformly or randomly (e.g., having any location or orientation on the stylus) without departing from the teachings of the present disclosure.

In one example, the magnetic field sources may be placed, oriented, and/or otherwise configured such that, at least one point, a first vector representing the magnetic force associated with the magnetic field emitted by the first magnetic field source and a second vector representing the magnetic force associated with the magnetic field emitted by the second magnetic field source differ in magnitude or direction or both. In another example, the magnetic field sources or magnetic emitters may be placed, oriented, and/or otherwise configured such that at two different points (a first point and a second point) in a plane, a magnitude or direction of a magnetic force vector associated with the first magnetic field at the first point and a magnetic force vector associated with the first magnetic field at the second point are the same while a magnitude or direction of a magnetic force vector associated with the second magnetic field at the first point and a magnetic force vector associated with the second magnetic field at the second point are different.

In one embodiment, the magnetic field source 102 may be a magnetic emitter, ultrasound transformer, or any other kind of emitters and/or transformers. For example, the magnetic field source 102 may be an open loop transformer that emits a magnetic field while acting as a transformer. In another example, the magnetic field source 102 may be a rare-earth magnet.

Referring to FIG. 1, magnetic field 104 corresponds to the first magnetic field source 102. Similarly, magnetic field 108 corresponds to the second magnetic field source 106. In one embodiment, one or more of the magnetic field sources may constantly emit magnetic fields. In another embodiment, the magnetic field sources may operate during non-overlapping time durations. In yet another embodiment, each of the magnetic field sources may start emitting a magnetic field when a reference event is detected. For example, the event may be a press of a button, tip of the stylus touching the panel, or performing a reference gesture using the stylus and/or any other input devices.

In one embodiment, test points A 110 and B 112, in equal distances from the pen tip may be considered. For example, the test points may be located under the panel 120. Magnitude and direction of the magnetic fields emitted by the first and the second magnetic field sources (e.g., 102 and 106) may be sensed differently at these test points. For example, as illustrated in FIG. 1, at test point A 110 magnetic fields 104 and 108 have opposite directions. On the other hand, at test point B 112, the magnetic fields 104 and 108 have similar directions. If the pen is rolled 180 degrees, the test point A may experience magnetic fields that are in the same direction (not shown). Similarly, test point B may experience magnetic fields that are in opposite directions (not shown).

In one embodiment, a ratio between sensor readings corresponding to magnitudes of magnetic fields 104 and 108 may be considered as a metric for pen orientation. In addition, magnitudes of the magnetic fields and/or their direction may also be considered to determine pen rotation and/or orientation. Pen rotation and orientation may be determine based on any of the magnitude of a magnetic field at a given point (for example, the location of a sensor), the direction of a magnetic force associated with the magnetic field at the given point, the magnitude of a component of the magnetic field along a given direction at the given point, the ratio of the magnitude of a first magnetic field at the given point with the magnitude of a second magnetic field at the given point, the direction of a magnetic force associated with a first magnetic field at the given point and the direction of a magnetic force associated with a second magnetic field at the given point, or the ratio of the magnitude of a component of a first magnetic field along a given direction at the given point with the magnitude of a component of a second magnetic field along the given direction at the given point, or any combination thereof.

In one embodiment, one or more sensors may be located at different points on a computing device that communicates with the stylus 100. For example, a sensor may be located at each of the test points A 110 and B 112. In addition, one or more other sensors can be located on other locations on the computing device. In one embodiment, the device may have a touch-sensitive panel (e.g., a touch screen, touch pad, etc.). One or more sensors may be located under the touch-sensitive panel to receive and/or measure the magnetic fields emitted from the magnetic field sources on the stylus. Signal readings from these sensors may be used by the computing device to identify gestures. In one embodiment, two or more coils may be located at known locations under the panel. For example, a first coil may be located at point A and a second coil may be located at point B. In general, the first and the second coils may be located on or under the panel 120. Each coil may sense one or more of the magnetic fields 104 and 108. Magnitude and direction of the magnetic fields may then be measured.

In one embodiment, each of the magnetic field sources 102 and 106 may send a specific code. These codes can be used by the computing device to distinguish between the magnetic fields transmitted from different emitters. The computing device may determine a metric based on the direction and/or magnitude of different magnetic fields, and other parameters to identify gestures (e.g., rolling, micro-twist, and the like) performed on the stylus 100.

Certain embodiments identify one or more pen input gestures, such as rolling, micro-twist, pen orientation, and the like. As a result, functionality of the pen can be increased without switching to a gesture mode. It should be noted that devices that currently exist in the art often require the user to turn on a gesture mode (e.g., in a menu of options). When gesture mode is turned on, gesture detection sensors (e.g., IR, VL camera, ultrasound) start collecting data for the gesture detection algorithms. Having a "gesture mode" helps to conserve power and to avoid false detection. Some devices that exist in the art require the user to perform an engagement gesture (e.g., open hand) to initiate gesture detection. This is done in a low-power mode with an algorithm that is only looking for the engagement gestures and ignores all other gestures. Once the engagement gesture is detected, then full gesture detection is initiated. This is also due to power conservation and to avoid false detection.

One embodiment determines whether a movement of a stylus is an intended gesture or an unintended gesture to avoid false detection of the gestures performed by a user. An intended-gesture movement may correspond to a movement intended by the user as a user input. The unintended-gesture movement may correspond to a movement that is not intended as a user input (and is therefore not used as user input), such as manipulation of pen grip, or any other unintended-gesture movement. It should be noted that the embodiments presented herein do not impose additional power draw, therefore there is no need for a low-power, low-functionality state. Hence, the embodiments below allow the inputting of gestures without entering the device into a "gesture mode" or using an engagement gesture to begin gesturing.

Figure 2:
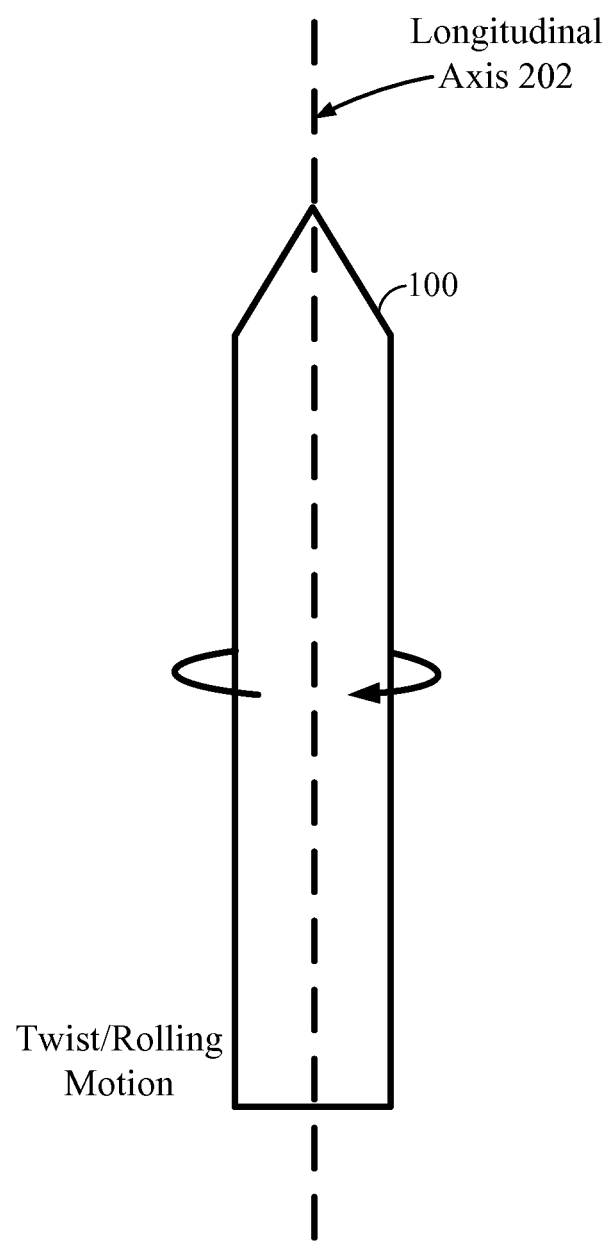
FIG. 2 illustrates an exemplary twisting/rolling motion, in accordance with certain embodiments of the present disclosure.

FIG. 2 illustrates an exemplary twisting or rolling motion, in accordance with certain embodiments of the present disclosure. As illustrated, in a rolling motion a stylus may be rolled along its longitudinal axis 202 either in clock-wise or counter clock-wise direction.

Micro-Twist Gesture

FIGS. 3A through 3D illustrate an exemplary micro-twist gesture using a stylus 100, in accordance with certain embodiments of the present disclosure. As illustrated in FIG. 3A, a user may hold the stylus 100 in his hand. In this case, the user's index figure may touch the stylus at an imaginary point Index contact$_0$, as illustrated in FIG. 3B. In addition, the user's thumb may touch the stylus at point Thumb contact$_0$. The micro-twist gesture may be defined by three main stages, as follows:

i) An initial rolling movement about a longitudinal axis of the stylus in one direction (e.g., clockwise or counter-clockwise). The initial state is shown in FIG. 3B. After performing the rolling motion, the user may hold the stylus such that the user's index figure touches the stylus at point Index contact$_1$, as illustrated in FIG. 3C. In addition, user's thumb may touch the stylus at point Thumb contact$_1$.

ii) An abrupt stop and change in direction of the movement; and iii) A rolling movement back in the opposite direction along the longitudinal axis of the stylus. In one example, the stylus may be rolled back until it reaches an orientation which is close to the orientation of the stylus at the start of the initial rolling movement (for example, as shown in FIG. 3B). After performing the rolling-back motion, the user may hold the stylus such that user's index figure touches the stylus at point Index contact$_F$, as illustrated in FIG. 3D. In addition, user's thumb may touch the stylus at point Thumb contact$_F$.

Therefore, the micro-twist gesture may include a relatively short rolling movement in one direction followed by a quick change in direction and another relatively short rolling movement in the opposite direction. In one embodiment, one or more parameters may be used by a computing device to detect the micro-twist gesture. These parameters may include speed of twisting motions, quickness in changing the direction, duration of twists, position of the pen in-air, tilt angle in relation to the screen during twist, whether or not 'fiddling' movements are present, or any other parameter related to the movement.

It should be noted that in this disclosure, the distinction between points of contact (e.g., Index contact$_0$-Index contact$_F$ and Thumb contact$_0$-Thumb contact$_F$), is only made for illustration purposes. However, a user may perform these movements, without having to hold the stylus in a certain way. In general, the stylus may be moved by any means without departing from the teachings of the present disclosure.

FIGS. 4A through 4D illustrate example graphs showing angle of rotation of the stylus with respect to time, in accordance with certain embodiments of the present disclosure. FIG. 4A illustrates a gesture that is considered an intended micro-twist gesture. In FIG. 4A, the micro-twist gesture starts at angle $roll_0$, the stylus is rolled until angle of rotation θ reaches $roll_1$. The rotation may then stop at point θ=$roll_1$. The rotation may then change direction to roll from $roll_1$ to $roll_F$ in a relatively short time. In one embodiment, the angle $roll_F$ may be similar or close to the initial angle (e.g., $roll_0$). The number of degrees between $roll_0$, and $roll_1$ can be referred to, for example, as the turn angle.

FIG. 4B shows a grip adjustment movement, which includes a rolling movement in one direction from $roll_0$ to $roll_1$. However, the movement shown in FIG. 4B does not include a change of direction and a movement in opposite direction, therefore, it is not considered a micro-twist gesture. However, it is understood that the gesture shown in FIG. 4B may still be a valid, intended rolling gesture as discussed further in reference to FIG. 5, below.

FIG. 4C illustrates a multi-directional movement, in which a stylus is rolled in one direction, after some time, it is rolled in the same direction a few more degrees, and then rolled a few degrees in the opposite direction, but not enough to reach a point close to the starting point of the initial twist. Therefore, this movement may not be considered a micro-twist gesture.

FIG. 4D illustrates a graph for a gesture that is similar to the micro-twist gesture shown in FIG. 4A, however, the gesture in FIG. 4D takes too long to complete. As a result, the motion illustrated in FIG. 4D cannot be considered as a micro-twist gesture. In one embodiment, a threshold may be defined for the rolling speed and/or rolling time duration. If the rolling speed is less than the threshold (e.g., which can be translated to taking a longer time to finish the gesture), then the gesture may not be considered as a micro-twist gesture. In other words, the twist gesture (rolling in a first direction followed by rolling in a second, opposite direction) should be completed within a time period below a reference threshold.

In one example, a micro-twist gesture consisting of rolling in one direction followed by roll back in an opposite direction (e.g., an intended gesture) may take between 0.5 and 0.8 seconds. On the other hand, a grip adjustment movement consisting of movement of finger position (e.g., an unintended gesture) may take between 1.2 to 1.7 seconds. In another example, fiddling in a variety of different ways, which is also an unintended gesture, may take 1.4 seconds and longer. In this example, the reference threshold may be defined between 0.8 and 1.2 seconds (e.g., 1 second). It should be noted that these numbers are mere examples, and any other values may be considered as reference threshold without departing from the teachings of the present disclosure.

Filtering Out False Positives

As shown and described in FIGS. 4A through 4D, by following location/orientation of the pen, intentional rotations and/or twists of the pen may be differentiated from unintentional rotations. The unintentional rotations may result from normal usage of the pen (e.g., writing and moving the pen). Intentional rotations may provide predefined commands to the computing device. For example, false positives may be filtered out using a reference turn angle threshold. In this example, a rotational movement may be ignored if the turn angle of the rotational movement is below the reference threshold, for example 30, 45, or 90 degrees. As another example, false positives may be filtered out using a reference time threshold, for example the rotational movement may be ignored if the time to complete the turn angle is longer than 0.8 or 1.0 seconds. As another example, false positives may be filtered out using a combination of reference turn angle threshold and time threshold. For example, false positives could be ignored if the turn angle is less than 30 degrees and the time from the beginning of the rotation to the end of the rotation is greater than 0.5 or 0.75 seconds. In the case of a micro-twist gesture, in addition to the thresholds just discussed, false positives may be filtered out if rotation in the first direction is not followed by rotation in the second, opposite direction. In other words, false positives could be filtered out if a first turn angle in the first direction is not followed within a time threshold by a second turn angle in the second, opposite direction where the first and second turn angles may be the same or different. It should be noted that although FIGS. 4A through 4D are described directed to an exemplary micro-twist gesture, a person of ordinary skill in the art could readily apply these teachings to detect any other gesture, and filter out false positives without departing from the teachings of the present disclosure.

It should be noted that although a stylus is considered as an example device, similar teachings may be readily applied to any other devices having one or more sensors and/or magnetic field sources, such as mobile devices, phones, tablets, digital pens and pen tablets, etc., all of which fall within the teachings of the present disclosure.

In one embodiment, the rolling, micro-twist, and other gestures may be detected using one or more positional sensors instead of, or in addition to, the magnetic field sources. For example, the stylus may have at least one sensor or emitter, or both, physically coupled to the elongated body to facilitate gathering of rotation-related information by the computing device. The positional sensor may include an accelerometer, a gyro, or any other type of sensor capable of detecting position and/or orientation of the stylus. As an example, the stylus may include at least one accelerometer that can detect movements of the pen. Similar to the embodiment utilizing the magnetic field sources, the micro-twist gesture may be identified when the accelerometers detect a rotation in one direction, and change of direction and movement in opposite direction in a limited time. Similarly, the rolling gesture may be detected by the accelerometers if the accelerometers detect a rolling motion for a certain number of degrees. As another example, the stylus may include means for sensing or indicating rotation of the stylus physically coupled to the stylus. In one embodiment, the means for sensing rotation of the stylus can include a positional sensor as described above. In another embodiment, the means for indicating rotation of the stylus can include one or more magnetic field sources physically coupled to the stylus which can be sensed by magnetic sensors whereby changes in the magnetic fields emitted from the magnetic field sources can be sensed to indicate rotation of the stylus.

In one embodiment, the stylus may include a processor, a memory or other elements to store and/or analyze the measurements from the accelerometers. The stylus may also include transmitters to transmit such information to the computing device to identify and perform the commands originated from the user. In other embodiments, the stylus does not include a processor but only includes magnetic field sources whose fields (e.g., magnetic fields) and/or emissions are detected by sensors aboard the computing device.

Pen Orientation Gesture

In one embodiment, an orientation gesture may be defined to refer to one or more functionalities which become available to the user depending, for example, on which side of the stylus is facing upwards. In one embodiment, if a stylus has a cross section with a geometric shape such as a triangle, square, hexagonal, etc., different functionalities may be assigned to different sides of the stylus.

In one embodiment, the orientation of a 'side up' may be defined as a side of the stylus which faces in a direction closest to what is considered the "up" direction. The "up" direction may be defined absolutely or relatively with respect to the computing device. In one example, the "up" direction may be defined absolutely as the direction opposite the direction of Earth's gravitational force. By contrast, in another example, the "up" direction may be defined relatively as the direction normal to and outward from the planar surface of a display of the computing device (e.g., a tablet device). In that case, when the user is lying in bed, for instance, the "up" direction may actually be pointed down toward the ground or another direction that is quite different from what another person might consider to be the "up" direction.

The orientation gesture may be used to control one or more aspects of the operations performed using the stylus and/or computing device. For example, in a software application where the stylus is used to draw or write, the side of the stylus which is facing "up" may correspond to the color of the ink of the writing or drawn object. Hence, in one implementation, a computing device can obtain an orientation of the stylus using magnetic field information (as described with reference to FIG. 1) to identify the side of the stylus which is "up." Alternatively, the stylus may include a gyroscope capable to identifying the side of the stylus which is up, and this information can be communicated to the computing device wirelessly. The computing device may then identify and perform an operation in response to the orientation-related information. For example, the computing device may change a color of a font in response to a change in the orientation of the stylus. In another example, the computing device may perform an operation unrelated to drawing, such as opening an application, executing a function (e.g., a mathematical function, a command, scroll, zoom in or out, etc.), etc., after detecting a change in the orientation of the stylus.

Generally, a pen is associated with drawing and/or writing operations. However, a stylus according to one embodiment, may be used as an input device to provide any type of input for a computing device. As described earlier, these inputs may correspond to operations that are related to drawing and/or operations that are unrelated to drawing. The operations that are related to drawing may refer to operations in which the stylus is used to make marks on a screen. Thus, different manipulations of the stylus may affect shape, size, and/or color of each mark on the screen. For example, the stylus may be manipulated to change color and/or size of text or a drawing object, thickness of a line, and the like.

In one embodiment, the stylus may be used to provide input corresponding to operations that are unrelated to drawing. For example, the stylus may be used to navigate a user interface (UI) in which different manipulations of the stylus bring up menus, activate one or more short cuts, delineate different types of touch, correspond to long press vs. short press, and any other type of function. In another example, in a gaming application, orientation of the stylus may correspond to different functions that are performed by an avatar (e.g., different operations that are performed to navigate in two-dimensional (2D) or three-dimensional (3D) space). In yet another example, the stylus may be manipulated to provide input corresponding to navigating to a menu item (e.g., scrolling to the end of a list), performing a function in a different application (e.g., pausing audio playback), performing a function in a gaming application (e.g., switching between weapons in a first person shooter (FPS) game), opening an application (e.g., going to a Text Messaging application, or specifically initiating a new text message), and/or any other functions.

In one embodiment, a system level action may be triggered by manipulation of the stylus. The system-level action may or may not be associated with an active application. For example, if the stylus is manipulated in a specific way (e.g., two twists to the right) the music player may be silenced from any state. In another example, a specific manipulation of the stylus opens up the music player application.

Rolling Gesture

One embodiment defines a rolling gesture similar to the micro-twist gesture in that the user rolls the stylus a certain number of degrees in a deliberate fashion to successfully input the command. Rolling gesture may refer to spinning the stylus a ¼ turn or 90°, 180°, 360°, and/or any other degrees. In general, any reference turn angle may correspond to a particular command. As an example, a user may roll a stylus 90° to enter a first command. Alternatively, the user may roll the stylus 180° to enter a second command. The second command may be different from the first command. In another example, the user may roll the stylus 360° to enter a third command. In yet another example, the user may roll the stylus one or more full and/or partial turns. For example, the user may roll the stylus one and half turns, two turns, or any other number of turns. As a result, by detecting degree of a deliberate rolling movement, the computing device can identify a command associated with the rolling gesture and perform the command. In some embodiments, rolling the stylus a first number of degrees corresponds to a first command, while rolling the stylus a second number of degrees different from the first number of degrees corresponds to a second command different from the first. In another micro-twist-like gesture embodiment, rolling the stylus a first number of degrees and then rolling the stylus roughly back to the original position can correspond to a first command, while rolling the stylus a second number of degrees different from the first number of degrees and then rolling the stylus roughly back to the original position can correspond to a second command different from the first command. In such an embodiment, as discussed elsewhere herein, the gesture may be distinguished from unintended-gesture rotational movements by using a reference time threshold under which the gesture must be completed.

Figure 5:
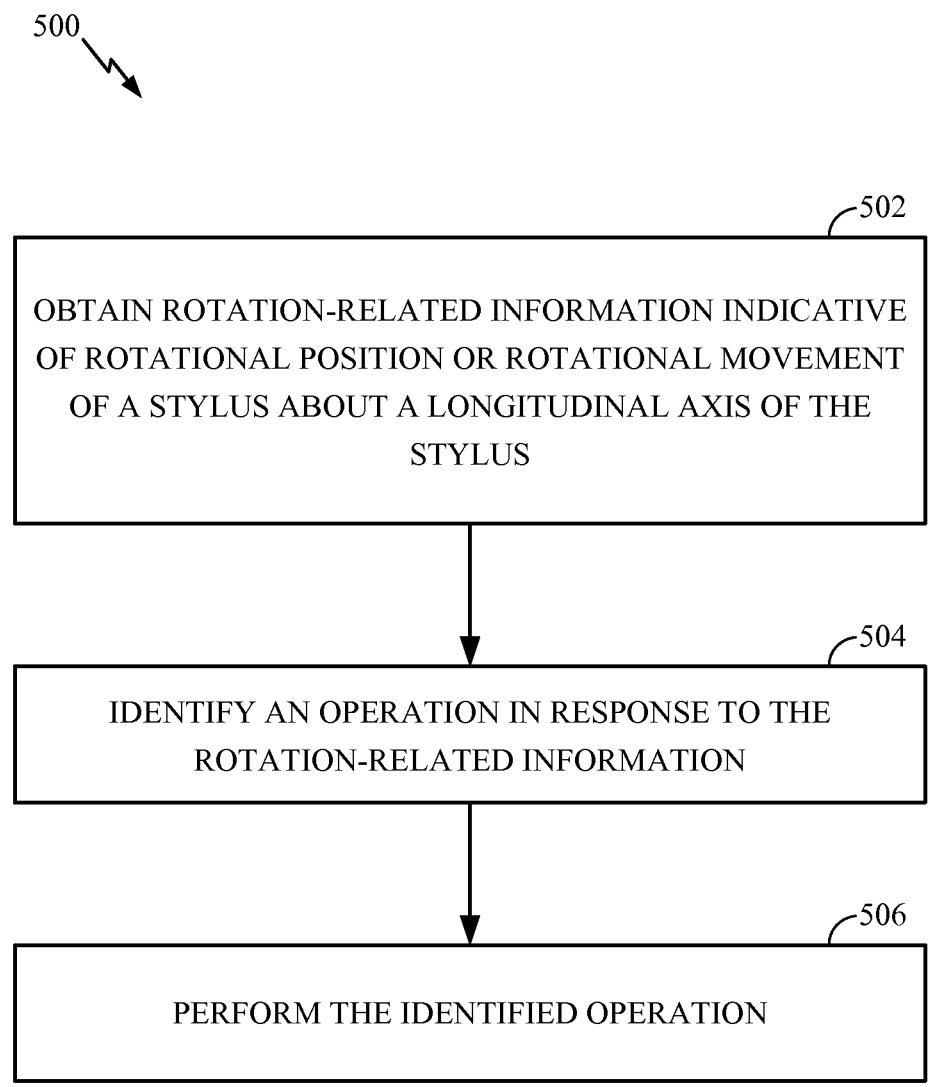
FIG. 5 illustrates exemplary operations for obtaining user input via a stylus, in accordance with certain embodiments of the present disclosure.

FIG. 5 illustrates exemplary operations 500 for obtaining user input via a stylus configured to serve as an interface for providing user input into a computing device, in accordance with certain embodiments of the present disclosure. At 502, the computing device obtains rotation-related information indicative of the rotational position or the rotational movement of the stylus about a longitudinal axis of the stylus. In one embodiment, the rotation-related information is indicative of a rotational movement of the stylus about the longitudinal axis to achieve a turn angle corresponding to a user-intended command. In one example, the turn angle may be one of a plurality of turn angles, each representing a different user-intended command. At 504, the computing device identifies an operation in response to the rotation-related information. In one example, the operation is unrelated to drawing. In some embodiments, identifying an operation in response to the rotation-related information may include determining a ratio of one magnetic sensor reading and a second magnetic sensor reading. At 506, the computing device performs the identified operation.

In one embodiment, the computing device analyzes the rotation-related information to distinguish intended rotational movement to be used as user input to the computing device from unintended rotational movement not used as user input to the computing device.

In one embodiment, the rotation-related information may include magnetic sensor readings from at least one magnetic sensor (e.g., at least one inductor coil, at least one Hall effect sensor, etc.) aboard the computing device. The magnetic sensor readings may measure forces from a magnetic field (for example, at least one magnetic field) emanating from a magnetic field source (e.g., active magnetic field emitter, transformer, etc.) aboard the stylus.

In one embodiment, the at least one magnetic field source includes at least one active magnetic field emitter positioned off of the longitudinal axis of the stylus. In one embodiment, a ratio between magnitudes of a first magnetic sensor reading from a first sensor and a second magnetic sensor reading from a second sensor is determined. In some embodiments, the direction of the magnetic force at the first sensor and the direction of the magnetic force at the second sensor may also be determined. The computing device may then identify the operation based at least on the determined ratio, the two directions, or both.

In one embodiment, the rotation-related information is indicative of a rotational position of the stylus about the longitudinal axis. For example, positional information may be derived from magnetic sensor readings as mentioned above, or position sensor readings from a positional sensor aboard the stylus and communicated to the computing device, or any combination thereof.

In one embodiment, the computing device may also obtain orientation-related information from the stylus. The orientation-related information may be indicative of which side of the stylus which is facing a reference direction. The computing device may then identify the operation in response to the orientation-related information.

Figure 6:
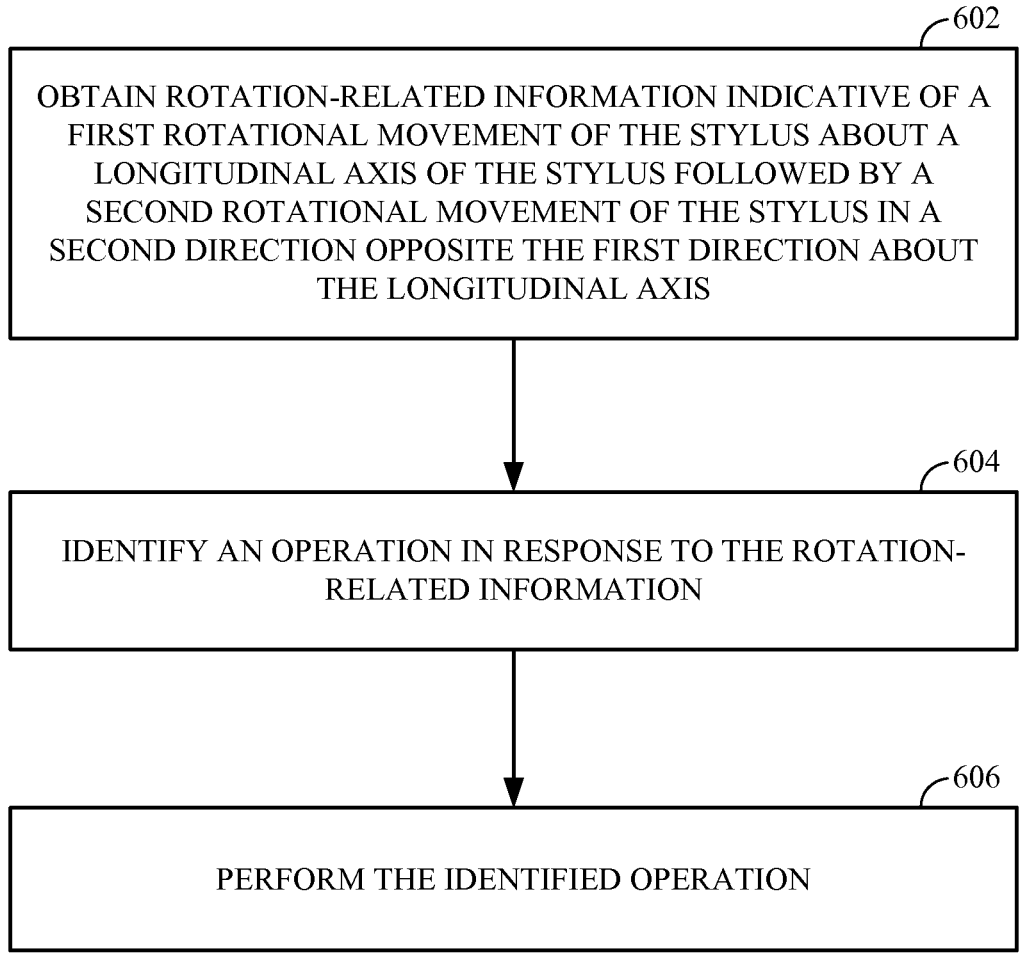
FIG. 6 illustrates exemplary operations for obtaining user input via a stylus, in accordance with certain embodiments of the present disclosure.

FIG. 6 illustrates exemplary operations for obtaining user input via a stylus configured to serve as an interface for providing user input into a computing device, in accordance with certain embodiments of the present disclosure. At 602, the computing device obtains rotation-related information indicative of a first rotational movement of the stylus in a first direction about a longitudinal axis of the stylus followed by a second rotational movement of the stylus in a second direction opposite the first direction about the longitudinal axis.

At 604, the computing device identifies an operation in response to the rotation-related information. For example, the computing device analyzes the rotation related information to detect a rotational movement and determine whether or not the detected rotational movement was used as a deliberate input for the computing device. The computing device may identify an operation based upon the extent or turn angle of the first rotation or the extent of the second rotation, or any combination thereof. For example, a quarter twist (roughly 90 degree turn angle) in a first direction followed by a quarter twist in the opposite direction may correspond to a first command, while a half twist (roughly 180 degrees turn angle) in a first direction followed by a half twist in a second direction may correspond to a second command. In another example, a quarter twist in a first direction followed by a quarter twist in the opposite direction may correspond to a first command, while a quarter twist in a first direction followed by a half twist in a second direction may correspond to a second command.

At 606, the computing device performs the identified operation. In one embodiment, the rotation-related information includes positional information derived from at least one positional sensor (e.g., an accelerometer) aboard the stylus.

In one embodiment, a stylus or a digital pen for providing user input may include an elongated body having a first and a second distal ends. Rotational position or rotational movement of the elongated body by the user allows the user to provide user input to a computing device. In addition, the stylus may include at least one sensor or emitter physically coupled to the elongated body to facilitate gathering of rotation-related information by the computing device. The rotation-related information may be indicative of the rotational position or the rotational movement of the elongated body about a longitudinal axis of the elongated body.

In one embodiment the stylus may include one or more active magnetic field emitters. For example, the stylus may include a first magnetic field emitter transmitting a first magnetic field corresponding to a first orientation, and a second magnetic field emitter transmitting a second magnetic field corresponding to a second orientation. In one example, the first orientation and the second orientation are different.

In one embodiment, the first orientation and the second orientation being different includes there being at least one point where a first vector representing the magnetic force associated with the magnetic field emitted by the first transformer/emitter at the at least one point and a second vector representing the magnetic force associated with the magnetic field emitted by the second transformer/emitter at the at least one point differ in magnitude or direction or both.

In another example, the first and the second orientations being different includes there being two different points (a first point and a second point) in a plane, wherein a magnitude or direction of a magnetic force vector associated with the first magnetic field at the first point and a magnetic force vector associated with the first magnetic field at the second point are the same while a magnitude or direction of a magnetic force vector associated with the second magnetic field at the first point and a magnetic force vector associated with the second magnetic field at the second point are different.

In yet another example, the first magnetic field emitter and the second magnetic field emitter may each have a physical axis and the first and second magnetic field emitters are disposed in the stylus such that the physical axis of the first magnetic field emitter and the physical axis of the second magnetic field emitter are non-parallel, for example skew, at an angle, or perpendicular. The physical axis, for example, may correspond to a vector at the center of a coil in the magnetic emitter that is perpendicular to a plane formed by at least one ring or turn of the coil.

In one embodiment, each of the active magnetic field emitters transmits an emitter-specific code. In another embodiment, the magnetic field emitters may operate at non-overlapping time durations, for example a first time duration and a second time duration. In general, the stylus may include any number of sensors or emitters without departing from the teachings of the present disclosure.

In addition, the sensors and/or emitters may be positioned off the longitudinal axis of the elongated body, on the axis of the elongated body, or any other positions on the stylus. In addition, the sensors and/or emitters may have any relative positions with respect to each other. For example, one or more of the sensors may be perpendicular or parallel to the other sensors. In another example, the sensors and/or emitters may be configured as illustrated in FIG. 1.

Figure 7:
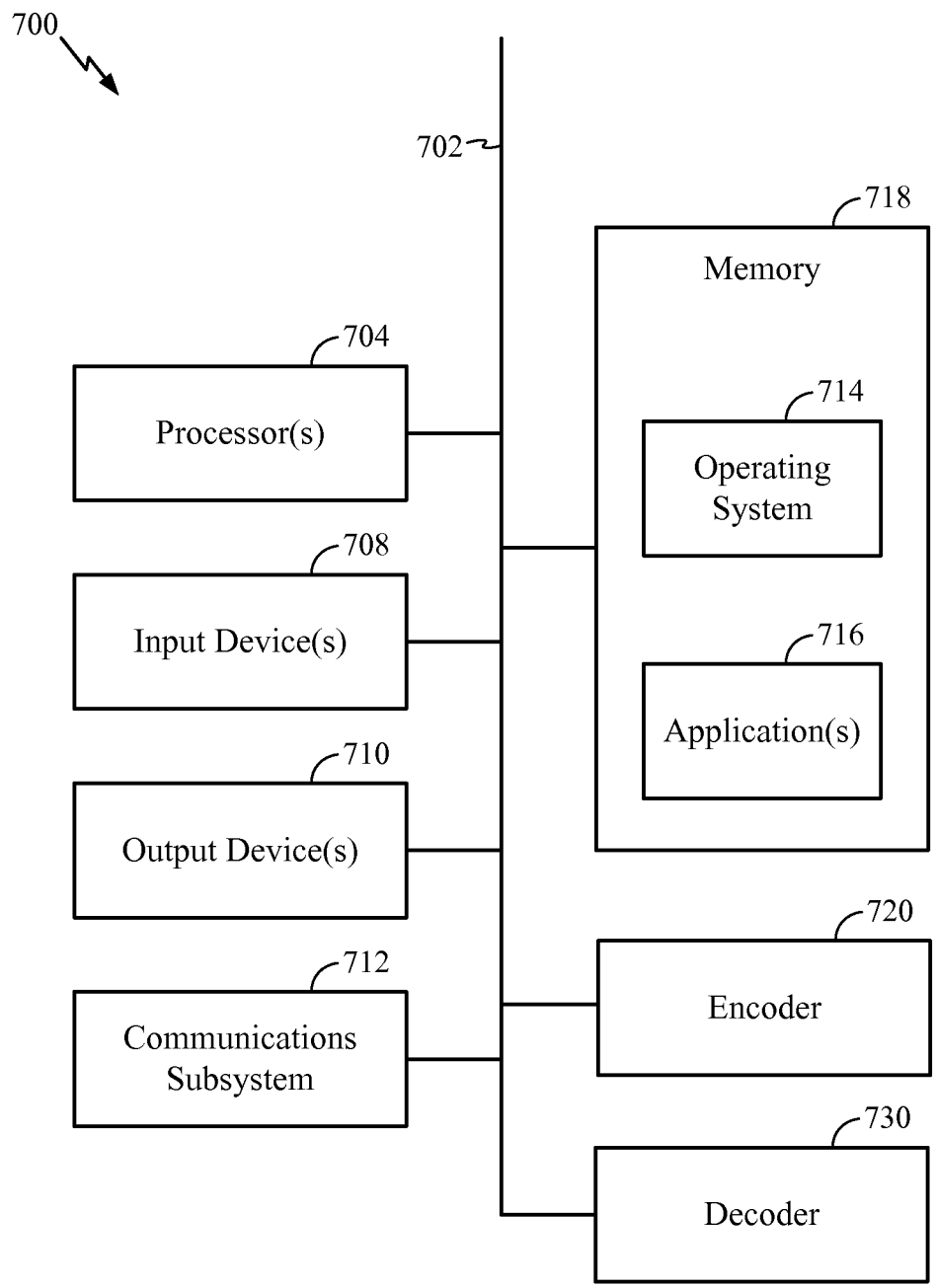
FIG. 7 describes one potential implementation of a device which may be used to obtain user input, in accordance with certain embodiments of the present disclosure.

FIG. 7 describes one potential implementation of a device 700 which may be used to obtain user input via a stylus, according to certain embodiments. In one embodiment, device 700 may be implemented with the specifically described details of process 500 and/or process 600. These modules may be implemented to interact with various other modules of device 700. In another embodiment, the device 700 may be the stylus, communicating with another computing device. Memory 718 may be configured to store data regarding magnetic fields and/or gestures, and may also store settings and instructions regarding the gestures, etc.

In the embodiment shown at FIG. 7, the device may be a mobile device or a stylus interacting with a mobile device and include processor 704 configured to execute instructions for performing operations at a number of components and can be, for example, a general-purpose processor or microprocessor suitable for implementation within a portable electronic device. Processor 704 may thus implement any or all of the specific steps 502 through 506 as illustrated in FIG. 5 and/or steps 602 through 606 as illustrated in FIG. 6 for obtaining user input as described herein. Processor 704 is communicatively coupled with a plurality of components within mobile device 700. To realize this communicative coupling, processor 704 may communicate with the other illustrated components across a bus 702. Bus 702 can be any subsystem adapted to transfer data within mobile device 700. Bus 702 can be a plurality of computer buses and include additional circuitry to transfer data.

In one embodiment, means for obtaining orientation-related information may correspond to one or more sensors and/or other input devices 708. In addition means for identifying an operation, means for analyzing and/or means for determining may correspond to the processor 704, or any other means capable of performing the above operations.

Memory 718 may be coupled to processor 704. In some embodiments, memory 718 offers both short-term and long-term storage and may in fact be divided into several units. Short term memory may store data which may be discarded after an analysis, or all data may be stored in long term storage depending on user selections. Memory 718 may be volatile, such as static random access memory (SRAM) and/or dynamic random access memory (DRAM) and/or non-volatile, such as read-only memory (ROM), flash memory, and the like. Furthermore, memory 718 can include removable storage devices, such as secure digital (SD) cards. Thus, memory 718 provides storage of computer readable instructions, data structures, program modules, and other data for mobile device 700. In some embodiments, memory 718 may be distributed into different hardware modules.

In some embodiments, memory 718 stores a plurality of applications 716. Applications 716 contain particular instructions to be executed by processor 704. In alternative embodiments, other hardware modules may additionally execute certain applications or parts of applications. Memory 718 may be used to store computer readable instructions for modules that implement scanning according to certain embodiments, and may also store compact object representations as part of a database.

In some embodiments, memory 718 includes an operating system 714. Operating system 714 may be operable to initiate the execution of the instructions provided by application modules and/or manage other hardware modules as well as interfaces with communications subsystem 712. For example, operating system 714 may be operable to initiate execution of instructions to obtain rotation related information, identify an operation in response to the obtained information, and/or perform the identified operation. Operating system 714 may be adapted to perform other operations across the components of mobile device 700, including threading, resource management, data storage control and other similar functionality.

In some embodiments, mobile device 700 includes a plurality of other hardware modules (e.g., encoder 720, decoder 730). Each of the other hardware modules is a physical module within mobile device 700. However, while each of the hardware modules is permanently configured as a structure, a respective one of hardware modules may be temporarily configured to perform specific functions or temporarily activated.

Other embodiments may include sensors integrated into device 700. An example of a sensor can be, for example, an accelerometer, a wi-fi transceiver, a satellite navigation system receiver (e.g., a global positioning system (GPS) module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module that combines an accelerometer and a gyroscope), an ambient light sensor, a relative humidity sensor, or any other similar module operable to provide sensory output and/or receive sensory input. In some embodiments, one or more functions of the sensors may be implemented as hardware, software, or firmware. Further, as described herein, certain hardware modules such as the accelerometer, the GPS module, the gyroscope, the inertial sensor, or other such modules may be used in conjunction with the camera and image processing module to provide additional information. In certain embodiments, a user may use a stylus, such as described herein, to communicate with one or more input devices 708. Alternatively, the stylus, such as described herein, may be considered an input device 708.

Mobile device 700 may include a component such as a communications subsystem 712 which may integrate antenna and wireless transceiver with any other hardware, firmware, or software necessary for wireless communications. Such a wireless communication module may be configured to receive signals from various devices such as data sources via networks and access points such as a network access point. In certain embodiments, compact object representations may be communicated to server computers, other mobile devices, or other networked computing devices to be stored in a remote database and used by multiple other devices when the devices execute object recognition functionality In addition to other hardware modules and applications in memory 718, mobile device 700 may have one or more output devices 710, and one or more input devices 708. The one or more output devices 710 present information from mobile device 700 to the user. This information may be derived from one or more application modules, one or more hardware modules, a combination thereof, or any other suitable means for providing content to the user (e.g., by operating system 714). The output device 710 may be a display screen and use liquid crystal display (LCD) technology, light emitting polymer display (LPD) technology, or any other display technology. In some embodiments, output device 710 is a capacitive or resistive touch screen and may be sensitive to haptic and/or tactile contact with a user. In such embodiments, the output device 710 can comprise a multi-touch-sensitive display. In one embodiment, the multi-touch sensitive display may interact with a stylus. As an example, the stylus may be used to input commands to the mobile device, by touch, rolling, micro-twist and/or other gestures. Output device 710 may then be used to display any number of outputs associated with other modules such as alerts, settings, thresholds, user interfaces, or other such controls.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes which may be depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application of various embodiments, and any number of steps may be undertaken before, during, or after the elements of any embodiment are implemented.

Having described several embodiments, it will therefore be clear to a person of ordinary skill that various modifications, alternative constructions, and equivalents may be used without departing from the spirit of the disclosure.

What is claimed is:

1. An apparatus comprising:
    an elongated body having a first and a second distal end, wherein user input to a computing device is provided through a rotational movement of the elongated body, the rotational movement being about a longitudinal axis of the elongated body;
    at least one sensor or emitter physically coupled to the elongated body to facilitate gathering of rotation-related information by the computing device, the rotation-related information indicating an angle of rotation of the elongated body during the rotational movement as a function of time; and
    at least one processor configured to:
        detect, based on the rotation-related information, a gesture performed upon the elongated body by a user, wherein the detecting of the gesture comprises:
            determining that the rotational movement comprises a first rotation in a first direction about the longitudinal axis followed by a second rotation in a second direction opposite the first direction about the longitudinal axis;
            determining that the first rotation and second rotation each exceed a turn angle threshold; and
            determining that the second rotation follows the first rotation within a threshold amount of time; and
        execute a predefined command in response to the detecting of the gesture and further in response to determining that a degree of the first rotation and a degree of the second rotation respectively correspond to a degree of first rotation and a degree of second rotation associated with the predefined command.

2. The apparatus of claim 1, wherein the at least one sensor or emitter comprises at least one active magnetic field emitter.

3. The apparatus of claim 2, wherein the at least one active magnetic field emitter comprises a first magnetic field emitter transmitting a first magnetic field having a first orientation, and a second magnetic field emitter transmitting a second magnetic field having a second orientation, the first orientation being different from the second orientation.

4. The apparatus of claim 2, wherein each of the at least one active magnetic field emitters transmit an emitter-specific code.

5. The apparatus of claim 2, wherein the at least one active magnetic field emitter comprises a first magnetic field emitter transmitting a first magnetic field during a first time duration, and a second magnetic field emitter transmitting a second magnetic field during a second time duration, the first time duration being different from the second time duration.

6. The apparatus of claim 1, wherein the at least one sensor or emitter comprises at least one positional sensor.

7. The apparatus of claim 6, wherein the at least one positional sensor comprises at least one accelerometer.

8. The apparatus of claim 1, wherein the at least one sensor or emitter is positioned off the longitudinal axis of the elongated body.

9. The apparatus of claim 1, wherein the at least one sensor or emitter comprises a first sensor or emitter positioned perpendicular to a second sensor or emitter.

10. The apparatus of claim 1, wherein the detecting of the gesture further comprises:
    determining that an angle at a beginning of the first rotation and an angle at an end of the second rotation are approximately the same.

11. A method comprising:
    receiving user input through a rotational movement of an elongated body of a stylus, the rotational movement being about a longitudinal axis of the elongated body,
    gathering rotation-related information using at least one sensor or emitter physically coupled to the elongated body, wherein the rotation-related information indicates an angle of rotation of the elongated body during the rotational movement as a function of time;

detecting, based on the rotation-related information, a gesture performed upon the elongated body by a user, wherein the detecting of the gesture comprises:

determining that the rotational movement comprises a first rotation in a first direction about the longitudinal axis followed by a second rotation in a second direction opposite the first direction about the longitudinal axis;

determining that the first rotation and second rotation each exceed a turn angle threshold; and determining that the second rotation follows the first rotation within a threshold amount of time; and executing a predefined command in response to the detecting of the gesture and further in response to determining that a degree of the first rotation and a degree of the second rotation respectively correspond to a degree of first rotation and a degree of second rotation associated with the predefined command.

12. The method of claim 11, wherein at least one of the at least one sensor or emitter is an active magnetic field emitter.

13. The method of claim 12, wherein a first magnetic field emitter transmits a first magnetic field having a first orientation, and a second magnetic field emitter transmits a second magnetic field having a second orientation, the first orientation being different from the second orientation.

14. The method of claim 12, wherein each of the at least one active magnetic field emitters transmit an emitter-specific code.

15. The method of claim 12, wherein a first magnetic field emitter transmits a first magnetic field during a first time duration, and a second magnetic field emitter transmits a second magnetic field during a second time duration, the first time duration being different from the second time duration.

16. The method of claim 11, wherein the at least one sensor or emitter comprises a first sensor or emitter positioned perpendicular to a second sensor or emitter.

17. The method of claim 11, wherein the detecting of the gesture further comprises:

determining that an angle at a beginning of the first rotation and an angle at an end of the second rotation are approximately the same.

18. An apparatus comprising:

an elongated body having a first and a second distal end, wherein user input to a computing device is provided through a rotational movement of the elongated body, the rotational movement being about a longitudinal axis of the elongated body;

means for sensing or indicating rotation of the elongated body physically coupled to the elongated body, the means for sensing or indicating rotation of the elongated body configured to facilitate gathering of rotation-related information, wherein the rotation-related information indicates an angle of rotation of the elongated body during the rotational movement as a function of time;

means for detecting, based on the rotation-related information, a gesture performed upon the elongated body by a user, wherein the means for detecting the gesture performed upon the elongated body by the user detects the gesture by:

determining that the rotational movement comprises a first rotation in a first direction about the longitudinal axis followed by a second rotation in a second direction opposite the first direction about the longitudinal axis;

determining that the first rotation and second rotation each exceed a turn angle threshold; and determining that the second rotation follows the first rotation within a threshold amount of time; and means for executing a predefined command in response to the detecting of the gesture and further in response to determining that a degree of the first rotation and a degree of the second rotation respectively correspond to a degree of first rotation and a degree of second rotation associated with the predefined command.

19. The apparatus of claim 18, wherein the means for sensing or indicating rotation of the elongated body comprises at least one active magnetic field emitter.

20. The apparatus of claim 19, wherein the at least one active magnetic field emitter comprises a first magnetic field emitter transmitting a first magnetic field having a first orientation, and a second magnetic field emitter transmitting a second magnetic field having a second orientation, the first orientation being different from the second orientation.

21. The apparatus of claim 19, wherein each of the at least one active magnetic field emitters transmit an emitter-specific code.

22. The apparatus of claim 19, wherein the at least one active magnetic field emitter comprises a first magnetic field emitter transmitting a first magnetic field during a first time duration, and a second magnetic field emitter transmitting a second magnetic field during a second time duration, the first time duration being different from the second time duration.

23. The apparatus of claim 18, wherein the means for sensing or indicating rotation of the elongated body comprises a first sensor or emitter positioned perpendicular to a second sensor or emitter.

24. The apparatus of claim 18, wherein means for sensing or indicating rotation of the elongated body comprises at least one positional sensor.

25. The apparatus of claim 18, wherein the means for detecting the gesture performed upon the elongated body by the user detects the gesture by determining that an angle at a beginning of the first rotation and an angle at an end of the second rotation are approximately the same.

26. A non-transitory processor-readable medium comprising processor-readable instructions configured to cause a processor to:

provide user input to a computing device in response to a rotational movement of an elongated body of a stylus, the rotational movement being about a longitudinal axis of the elongated body, wherein the user input is based on rotation-related information gathered using at least one sensor or emitter physically coupled to the elongated body, wherein the rotation-related information indicates an angle of rotation of the elongated body during the rotational movement as a function of time;

detect, based on the rotation-related information, a gesture performed upon the elongated body by a user, wherein the detecting of the gesture comprises:

determining that the rotational movement comprises a first rotation in a first direction about the longitudinal axis followed by a second rotation in a second direction opposite the first direction about the longitudinal axis;

determining that the first rotation and second rotation each exceed a turn angle threshold; and determining that the second rotation follows the first rotation within a threshold amount of time; and execute a predefined command in response to the detecting of the gesture and further in response to determining that a degree of the first rotation and a degree of the second rotation respectively correspond to a degree of first rotation and a degree of second rotation associated with the predefined command.

27. The non-transitory processor-readable medium of claim 26, wherein the at least one sensor or emitter comprises at least one active magnetic field emitter.

28. The non-transitory processor-readable medium of claim 27, wherein a first magnetic field emitter transmits a first magnetic field having a first orientation, and a second magnetic field emitter transmits a second magnetic field having a second orientation, the first orientation being different from the second orientation.

29. The non-transitory processor-readable medium of claim 27, wherein a first magnetic field emitter transmits a first magnetic field during a first time duration, and a second magnetic field emitter transmits a second magnetic field during a second time duration, the first time duration being different from the second time duration.

30. The non-transitory processor-readable medium of claim 26, wherein the detecting of the gesture further comprises:
   determining that an angle at a beginning of the first rotation and an angle at an end of the second rotation are approximately the same.

* * * * *